US012587355B2

(12) United States Patent
Adir et al.

(10) Patent No.: US 12,587,355 B2
(45) Date of Patent: Mar. 24, 2026

(54) POLYNOMIAL EVALUATION UNDER FULLY HOMOMORPHIC ENCRYPTION

(71) Applicant: International Business Machines Corporation, Armonk, NY (US)

(72) Inventors: Allon Adir, Kiryat Tivon (IL); Ramy Masalha, Kafr Qari (IL); Ehud Aharoni, Kfar Saba (IL); Hayim Shaul, Kfar Saba (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 72 days.

(21) Appl. No.: 18/242,067

(22) Filed: Sep. 5, 2023

(65) Prior Publication Data

US 2025/0080317 A1 Mar. 6, 2025

(51) Int. Cl.
*H04L 9/00* (2022.01)
*G06F 17/11* (2006.01)

(52) U.S. Cl.
CPC .............. *H04L 9/008* (2013.01); *G06F 17/11* (2013.01)

(58) Field of Classification Search
CPC ................................. H04L 9/008; G06F 17/11
See application file for complete search history.

(56) References Cited

U.S. PATENT DOCUMENTS

| | | | |
|---|---|---|---|
| 8,565,435 | B2 | 10/2013 | Gentry et al. |
| 8,903,083 | B2 | 12/2014 | Gentry et al. |
| 11,546,134 | B2 | 1/2023 | No et al. |
| 2010/0020965 | A1* | 1/2010 | Gueron ................. H04L 9/3066 380/28 |
| 2012/0039473 | A1* | 2/2012 | Gentry .................. H04L 9/3026 380/277 |
| 2013/0216044 | A1 | 8/2013 | Gentry et al. |
| 2017/0293913 | A1 | 10/2017 | Gulak et al. |
| 2018/0375639 | A1 | 12/2018 | Lauter et al. |
| 2019/0342270 | A1 | 11/2019 | Laine et al. |

(Continued)

OTHER PUBLICATIONS

Franklin et al., "Efficient and Secure Evaluation of Multivariate Polynomials and Applications," Applied Cryptography and Network Security, 2010, Lecture Notes in Computer Science, 2010, 18 pages, vol. 6123, Springer, Berlin, Germany, accessed Feb. 28, 2024, https://link.springer.com/chapter/10.1007/978-3-642-13708-2_15.

(Continued)

*Primary Examiner* — Vu V Tran
(74) *Attorney, Agent, or Firm* — Garg Law Firm, PLLC; Rakesh Garg; Anthony Mauricio Pallone

(57) ABSTRACT

An embodiment expands a polynomial into a plurality of products, each product in the plurality of products comprising a scaling coefficient multiplied by a sub-polynomial, each sub-polynomial comprising a sum of a plurality of addends, wherein a degree of each sub-polynomial is equal to a grouping parameter. An embodiment computes a plurality of ciphertext products, each ciphertext product equal to a ciphertext multiplied by itself a number of times, the number of times ranging from two to the grouping parameter. An embodiment computes, using the ciphertext and the plurality of ciphertext products in place of a variable of the polynomial, each of the plurality of products. An embodiment multiplies the plurality of products together.

20 Claims, 8 Drawing Sheets

(56) References Cited

U.S. PATENT DOCUMENTS

| | | | |
|---|---|---|---|
| 2021/0075588 A1 | 3/2021 | Khedr et al. | |
| 2021/0351913 A1 | 11/2021 | No et al. | |
| 2022/0182220 A1* | 6/2022 | Shin | G06F 7/523 |
| 2022/0271922 A1 | 8/2022 | No et al. | |
| 2025/0293854 A1 | 9/2025 | Adir et al. | |

OTHER PUBLICATIONS

Lu et al., "PEGASUS: Bridging Polynomial and Non-polynomial Evaluations in Homomorphic Encryption," IEEE Symposium on Security and Privacy, 2021, pp. 1057-1073, IEEE, accessed Feb. 29, 2024, https://ieeexplore.ieee.org/stamp/stamp.jsp?arnumber=9519408.

Malik et al., "Coyote: A Compiler for Vectorizing Encrypted Arithmetic Circuits," ASPLOS 2023: Proceedings of the 28th ACM International Conference on Architectural Support for Programming Languages and Operating Systems, Mar. 2023, pp. 118-133, vol. 3, acm.org, accessed Feb. 28, 2024, https://dl.acm.org/doi/10.1145/3582016.3582057.

Munro et al., "Optimal algorithms for parallel polynomial evaluation," 1Journal of Computer and System Sciences, 1973, pp. 189-198, vol. 7, Issue 2, accessed Feb. 29, 2024, https://www.sciencedirect.com/science/article/pii/S0022000073800431.

Okada et al., "Homomorphic Polynomial Evaluation Using Galois Structure and Applications to BFV Bootstrapping," Advances in Cryptology—ASIACRYPT 2023, 2023, pp. 1-32, vol. 14,443, Springer, Singapore, accessed Feb. 29, 2024, https://link.springer.com/chapter/10.1007/978-981-99-8736-8_3.

Smart et al., "Fully Homomorphic SIMD Operations," Designs, Codes, and Cryptography, Jul. 4, 2012, 19 pages, vol. 71, springer.

com, accessed Feb. 29, 2024, https://link.springer.com/article/10.1007/s10623-012-9720-4.

Chen et al., Labeled PSI from Fully Homomorphic Encryption with Malicious Security, CCS '18: Proceedings of the 2018 ACM SIGSAC Conference on Computer and Communications Security, pp. 1223-1237, Oct. 15, 2018.

Chen et al., An Encryption Depth Optimization Scheme for Fully Homomorphic Encryption, 2014 International Conference on Identification, Information and Knowledge in the Internet of Things, Oct. 17, 2014.

Liu et al., SecureBP from Homomorphic Encryption, Jun. 12, 2020.

Park et al., HE-Friendly Algorithm for Privacy-Preserving SVM Training, Apr. 1, 2020.

Boura et al., Simulating Homomorphic Evaluation of Deep Learning Predictions, CSCML 2019, May 30, 2019.

Wang et al., Efficient Homomorphic Integer Polynomial Evaluation based on GSW FHE, Dec. 14, 2016.

Paterson et al., On the No. of Nonscalar Multiplications Necessary to Evaluate Polynomials, Mar. 1973.

Pan, Methods of computing values of polynomials, Russian Mathematical Surveys, vol. 21, Issue 1, pp. 105-136, 1966.

Eve, The evaluation of polynomials, Numerische Mathematik, Dec. 31, 1964.

International Searching Authority, "Notification of Transmittal of the International Search Report and the Written Opinion of the International Searching Authority, or Declaration," Patent Cooperation Treaty May 7, 2025, 09 pages, International Application No.—PCT/ IB2025/051434.

Okada et al., "Homomorphic polynomial evaluation using Galois structure and applications to BFV bootstrapping", server date 20230902; downloaded by EPO on 20230925, Sep. 1, 2023, pp. 1-33, XP061081106.

* cited by examiner

Figure 3:
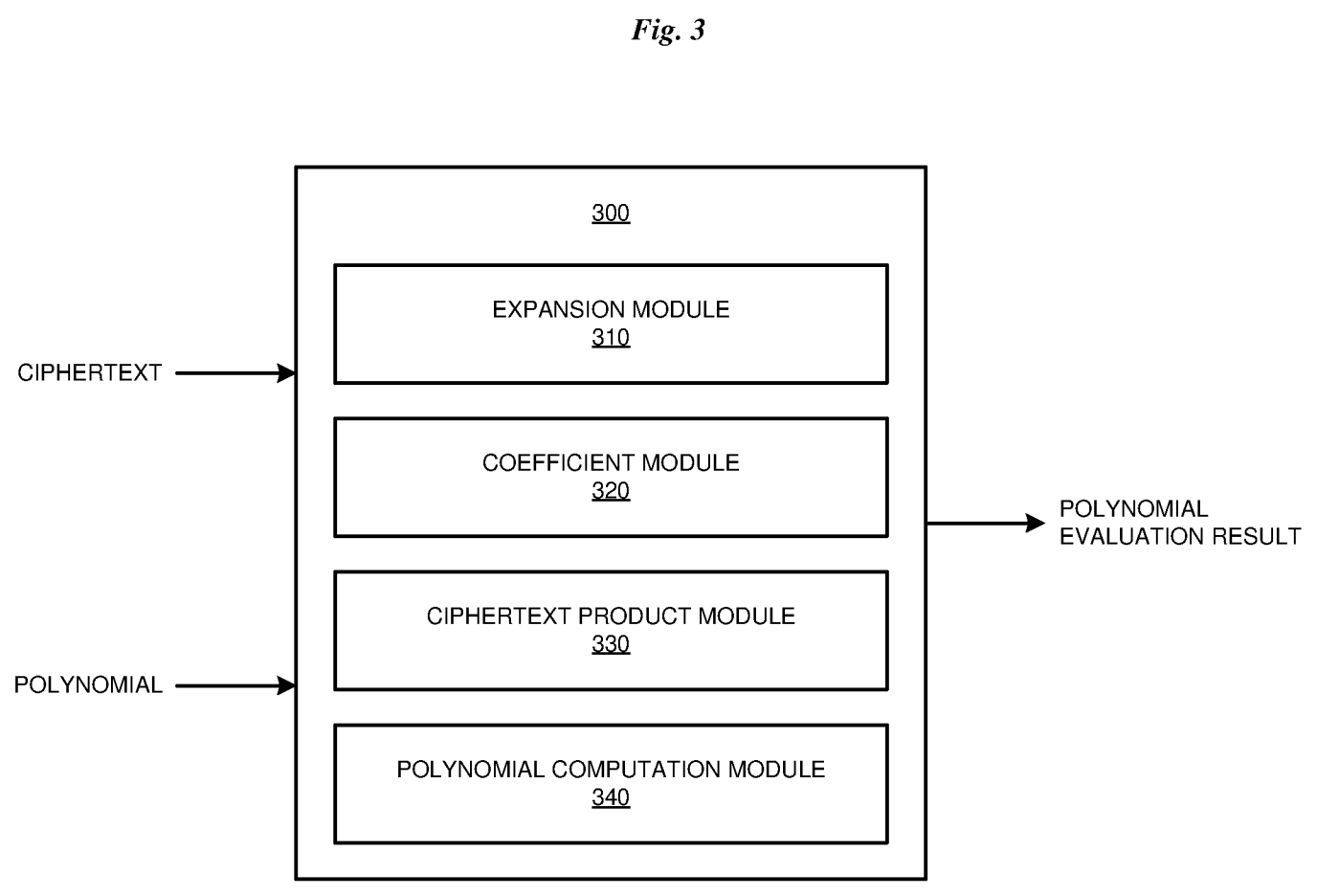

EXPANSION MODULE
310

COEFFICIENT MODULE
320

CIPHERTEXT PRODUCT MODULE
330

POLYNOMIAL COMPUTATION MODULE
340

CIPHERTEXT

POLYNOMIAL

POLYNOMIAL
EVALUATION RESULT

*Fig. 4*

POLYNOMIAL
410

$$P(x) = c * (x - r_1) * (x - r_2) * \ldots * (x - r_n)$$

SCALING COEFFICIENT
412

VARIABLE
414

ROOTS
416

REARRANGED POLYNOMIAL   420:
(WITH n/2 GROUPS OF 2 ROOTS EACH)

SUB-POLYNOMIAL
421

CIPHERTEXT
425

$$P(x) = c^{2/n} * (x^2 - (r_1 + r_2)x + r_1 r_2) *$$
$$c^{2/n} * (x^2 - (r_3 + r_4)x + r_3 r_4) * \ldots$$
$$c^{2/n} * (x^2 - (r_{n-1} + r_n)x + r_{n+1} r_n)$$

SCALING
COEFFICIENT
422

CIPHERTEXT
PRODUCT
423

SUB-POLYNOMIAL
COEFFICIENTS
424

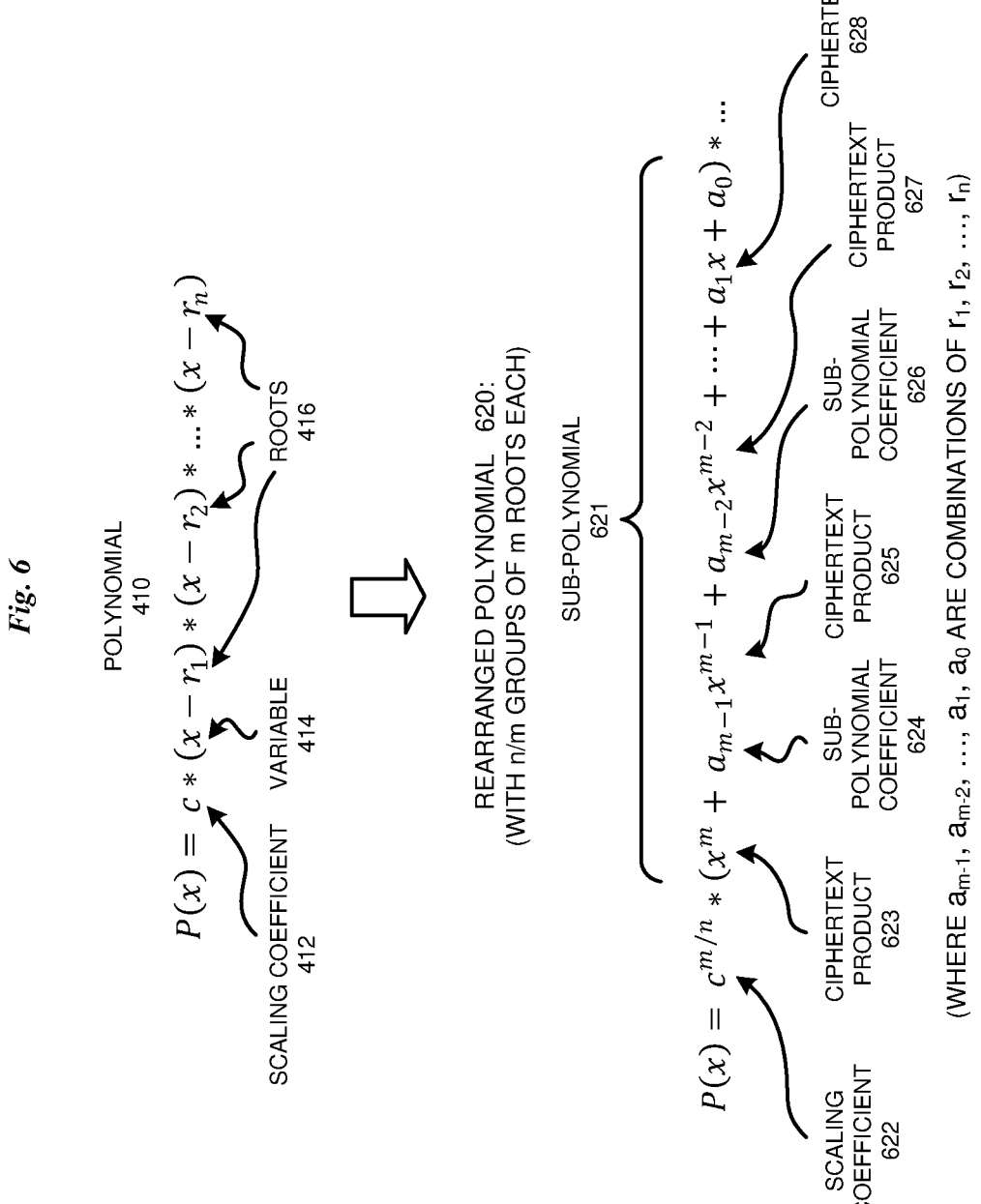

*Fig. 6*

POLYNOMIAL 410

$$P(x) = c * (x - r_1) * (x - r_2) * \ldots * (x - r_n)$$

SCALING COEFFICIENT 412

VARIABLE 414

ROOTS 416

REARRANGED POLYNOMIAL 620:
(WITH n/m GROUPS OF m ROOTS EACH)

SUB-POLYNOMIAL 621

$$P(x) = c^{m/n} * (x^m + a_{m-1}x^{m-1} + a_{m-2}x^{m-2} + \ldots + a_1 x + a_0) * \ldots$$

SCALING COEFFICIENT 622

CIPHERTEXT PRODUCT 623

SUB-POLYNOMIAL COEFFICIENT 624

CIPHERTEXT PRODUCT 625

SUB-POLYNOMIAL COEFFICIENT 626

CIPHERTEXT PRODUCT 627

CIPHERTEXT 628

(WHERE $a_{m-1}$, $a_{m-2}$, ..., $a_1$, $a_0$ ARE COMBINATIONS OF $r_1$, $r_2$, ..., $r_n$)

*Fig. 7*

PSEUDOCODE   700

COMPUTE OF ALL $x^m$, $x^{m-1}$, ..., $x^3$, $x^2$ $p = 1$

FOR i IN [1, n/m]:

EVALUATE THE i-TH SUB-POLYNOMIAL, USING PRE-COMPUTED $x^m$, $x^{m-1}$, ..., $x^3$, $x^2$ AND

COEFFICIENTS $a_{m-1}$, $a_{m-2}$, ..., $a_1$, $a_0$

MULTIPLY THE RESULT BY $c^{n/m}$ AND

MULTIPLY THE RESULT BY PREVIOUS VALUE OF p

RETURN p

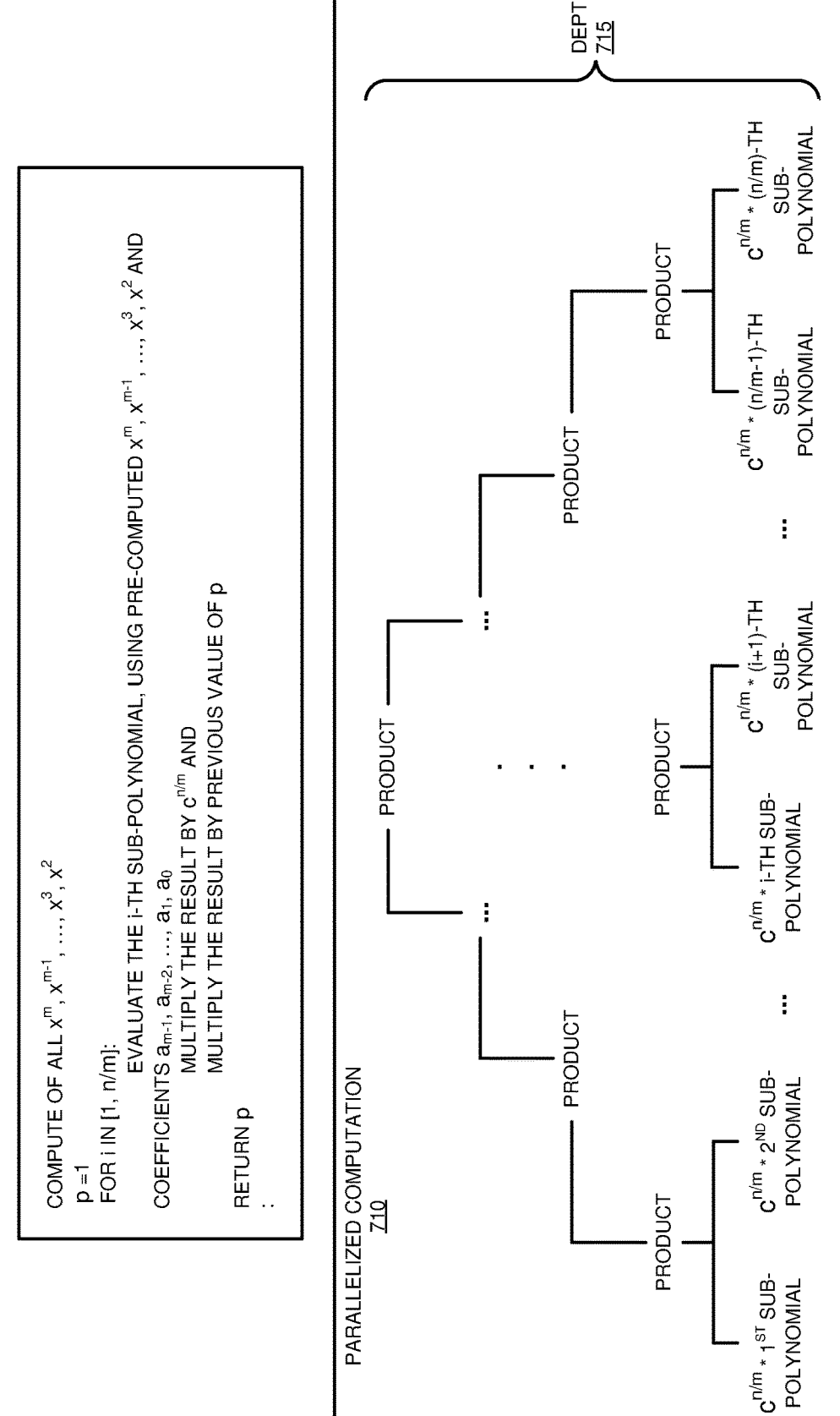

PARALLELIZED COMPUTATION 710

DEPTH 715

$c^{n/m} *$ 1ST SUB-POLYNOMIAL $c^{n/m} *$ 2ND SUB-POLYNOMIAL $c^{n/m} *$ i-TH SUB-POLYNOMIAL $c^{n/m} *$ (i+1)-TH SUB-POLYNOMIAL $c^{n/m} *$ (n/m-1)-TH SUB-POLYNOMIAL $c^{n/m} *$ (n/m)-TH SUB-POLYNOMIAL

PRODUCT

*Fig. 8*

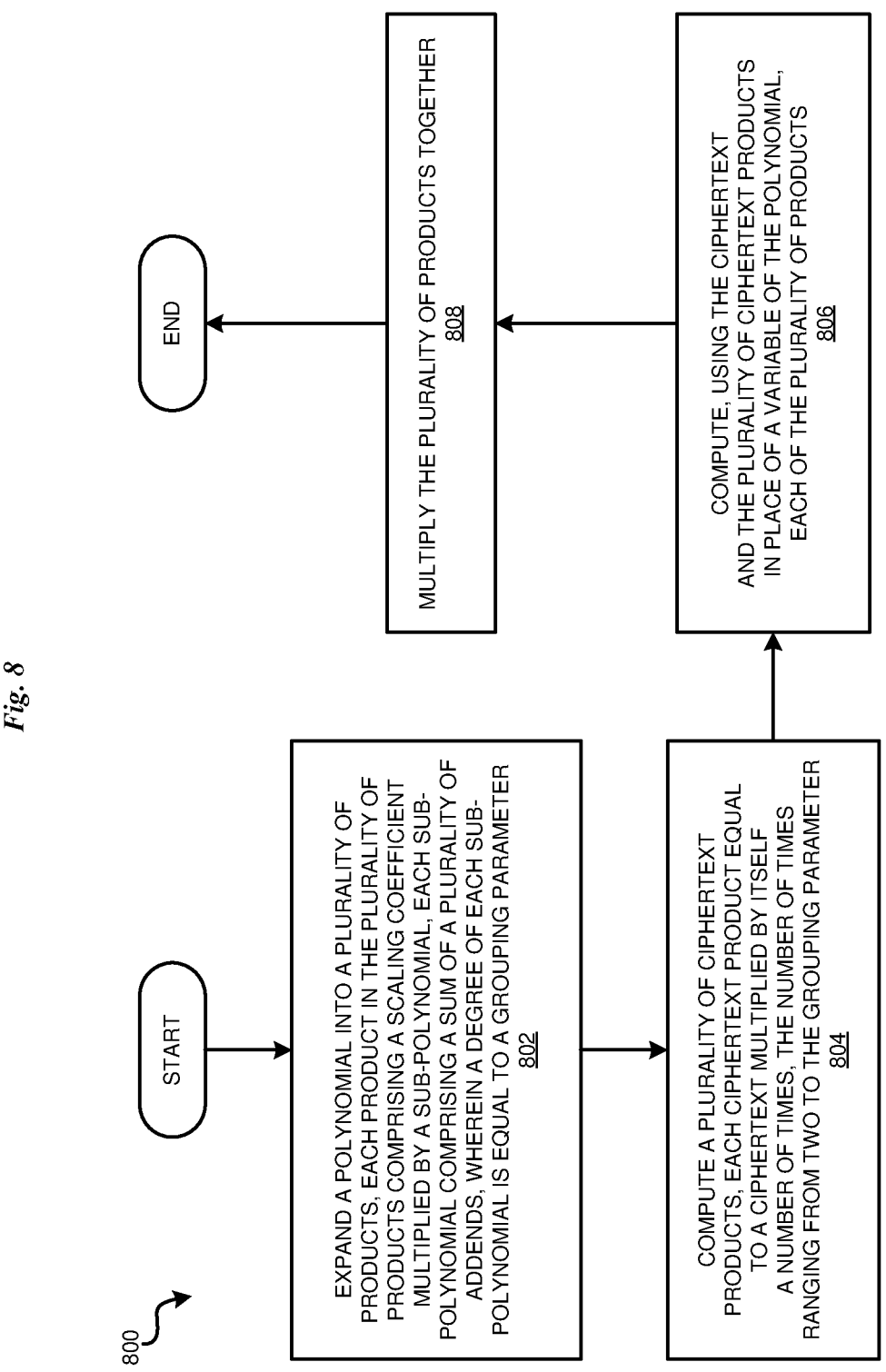

800

START

EXPAND A POLYNOMIAL INTO A PLURALITY OF PRODUCTS, EACH PRODUCT IN THE PLURALITY OF PRODUCTS COMPRISING A SCALING COEFFICIENT MULTIPLIED BY A SUB-POLYNOMIAL, EACH SUB-POLYNOMIAL COMPRISING A SUM OF A PLURALITY OF ADDENDS, WHEREIN A DEGREE OF EACH SUB-POLYNOMIAL IS EQUAL TO A GROUPING PARAMETER
802

COMPUTE A PLURALITY OF CIPHERTEXT PRODUCTS, EACH CIPHERTEXT PRODUCT EQUAL TO A CIPHERTEXT MULTIPLIED BY ITSELF A NUMBER OF TIMES, THE NUMBER OF TIMES RANGING FROM TWO TO THE GROUPING PARAMETER
804

COMPUTE, USING THE CIPHERTEXT AND THE PLURALITY OF CIPHERTEXT PRODUCTS IN PLACE OF A VARIABLE OF THE POLYNOMIAL, EACH OF THE PLURALITY OF PRODUCTS
806

MULTIPLY THE PLURALITY OF PRODUCTS TOGETHER
808

END

POLYNOMIAL EVALUATION UNDER FULLY HOMOMORPHIC ENCRYPTION

BACKGROUND

The present invention relates generally to fully homomorphic encryption. More particularly, the present invention relates to a method, system, and computer program for polynomial evaluation under fully homomorphic encryption.

Homomorphic encryption is a form of encryption in which computations can be performed on encrypted data, without first having to decrypt the data. A portion of encrypted data is also referred to as a ciphertext. The results of a computation under homomorphic encryption are encrypted, and sufficiently similar to a result that would have been obtained if the computation had been performed using decrypted data (there is some error due to numerical and cryptographic errors). Homomorphic encryption is typically used in privacy-preserving outsourced storage and computation, such as data storage that might be shared among multiple clients, analytics on multiple clients' data, or the training and use of a neural network model that operates on data from multiple clients. A system that implements arbitrary computation on ciphertexts is referred to as fully homomorphic encryption (FHE). Libraries implementing FHE are presently available.

A polynomial is a mathematical expression that includes variables and coefficients (also called constants) that involves only addition, subtraction, and multiplication, and positive-integer powers of variables. For example, both $(x-1)(x-2)$ and $x^2-3x+2$ are different representations of the same polynomial function. A uni-variate polynomial (i.e., a polynomial with one variable, usually denoted by x), can always be rewritten in the form $P(x)=a_n x^n+a_{n-1}x^{n-1}+\ldots +a_2 x^2+a_1 x+a_0$, where $a_n, \ldots, a_0$ are constants that are coefficients of the polynomial and n denotes the degree of the polynomial. Such a polynomial can also be considered as a function over the variable x, and can be evaluated by substituting a specific numerical value for x and performing the indicated operations.

As most FHE schemes support only addition, subtraction, and multiplication, results of other operations to be performed under FHE (e.g., division, square or cube roots, trigonometric functions, and the activation functions often used in neural networks), are typically estimated using a polynomial, by substituting a ciphertext for the variable of the polynomial and performing the indicated operations. Polynomial evaluation under FHE includes computing non-scalar products, which are products between two ciphertexts, as happens when a variable x needs to be squared, cubed, or raised to a higher exponent as required by a polynomial. Polynomial evaluation under FHE also includes computing scalar products, which are products between a ciphertext and a plaintext constant, as happens when a variable x is multiplied by a known coefficient. Polynomial evaluation under FHE also includes additions.

Presently available polynomial evaluation methods for use under FHE focus on minimizing the total number of operations required. In addition, computing non-scalar products is much more time consuming than computing scalar products and additions, and therefore polynomial evaluation methods can be improved by minimizing the number of non-scalar products that must be computed when evaluating a polynomial. Polynomial evaluation methods can also be improved by minimizing product depth (the depth of a computation tree implementing a multi-product multiplication as parallelized multiplications of pairs of operands).

To improve the estimation accuracy of a polynomial for some estimated function, a polynomial with a comparatively high degree is often used. However, this means that if the function is to be estimated for x values greater than 1 then the large power of x in the polynomial term of the highest power will have a very large value. This large value would then need to be brought down to the estimated value via a very small coefficient which will be correspondingly small. The FHE scheme is thus required to multiply an extremely small coefficient with an extremely large exponent, and provide a result with reasonable accuracy. In the fixed-point numerical representations used in most FHE schemes, numerical values must fit into a field with a specified number of bits, thus limiting the range of the numerical values that can be manipulated. When manipulating numerical values at extreme ends of this range, accumulating round-off and other errors lead to erroneous or inconsistent results. Thus, multiplying a very large number (at one end of the range) with a very small number (at the other end of the range) is error-prone and should be avoided. In addition, a polynomial with a comparatively high degree requires computation of more non-scalar products than a polynomial with a lower degree.

Thus, the illustrative embodiments recognize that there is a need for an improved polynomial evaluation method for use under FHE, that, for a polynomial being evaluated, minimizes the number of non-scalar products that must be computed and the product depth required to compute the non-scalar products, while maintaining the accuracy of the results by avoiding multiplication of very large with very small numbers.

SUMMARY

The illustrative embodiments provide for polynomial evaluation under fully homomorphic encryption. An embodiment includes expanding a polynomial into a plurality of products, each product in the plurality of products comprising a scaling coefficient multiplied by a sub-polynomial, each sub-polynomial comprising a sum of a plurality of addends, wherein a degree of each sub-polynomial is equal to a grouping parameter. An embodiment includes computing a plurality of ciphertext products, each ciphertext product equal to a ciphertext multiplied by itself a number of times, the number of times ranging from two to the grouping parameter. An embodiment includes computing, using the ciphertext and the plurality of ciphertext products in place of a variable of the polynomial, each of the plurality of products. An embodiment includes multiplying the plurality of products together. Thus, an embodiment provides polynomial evaluation under fully homomorphic encryption. Other embodiments of this aspect include corresponding computer systems, apparatus, and computer programs recorded on one or more computer storage devices, each configured to perform the actions of the embodiment.

In a further embodiment, the grouping parameter is equal to two. Thus, the embodiment provides additional detail of polynomial evaluation under fully homomorphic encryption.

In a further embodiment, the grouping parameter is equal to the square root of a degree of the polynomial rounded to the nearest integer. Thus, the embodiment provides additional detail of polynomial evaluation under fully homomorphic encryption.

In a further embodiment, computing each of the plurality of products is performed in series. Thus, the embodiment provides an order of operations of polynomial evaluation under fully homomorphic encryption.

In a further embodiment, computing each of the plurality of products is performed in parallel. Thus, the embodiment provides an order of operations of polynomial evaluation under fully homomorphic encryption.

In a further embodiment, the polynomial is a representation of a neural network activation layer being trained and the ciphertext is an encrypted polynomial coefficient of the polynomial. Thus, the embodiment provides additional detail of polynomial evaluation under fully homomorphic encryption, in a neural network training implementation.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of the illustrative embodiments when read in conjunction with the accompanying drawings, wherein:

FIG. 3 depicts a block diagram of an example configuration for polynomial evaluation under fully homomorphic encryption in accordance with an illustrative embodiment;

FIG. 4 depicts an example of polynomial evaluation under fully homomorphic encryption in accordance with an illustrative embodiment;

FIG. 6 depicts another example of polynomial evaluation under fully homomorphic encryption in accordance with an illustrative embodiment;

FIG. 7 depicts another example of polynomial evaluation under fully homomorphic encryption in accordance with an illustrative embodiment; and FIG. 8 depicts a flowchart of an example process for polynomial evaluation under fully homomorphic encryption in accordance with an illustrative embodiment.

DETAILED DESCRIPTION

Figure 1:
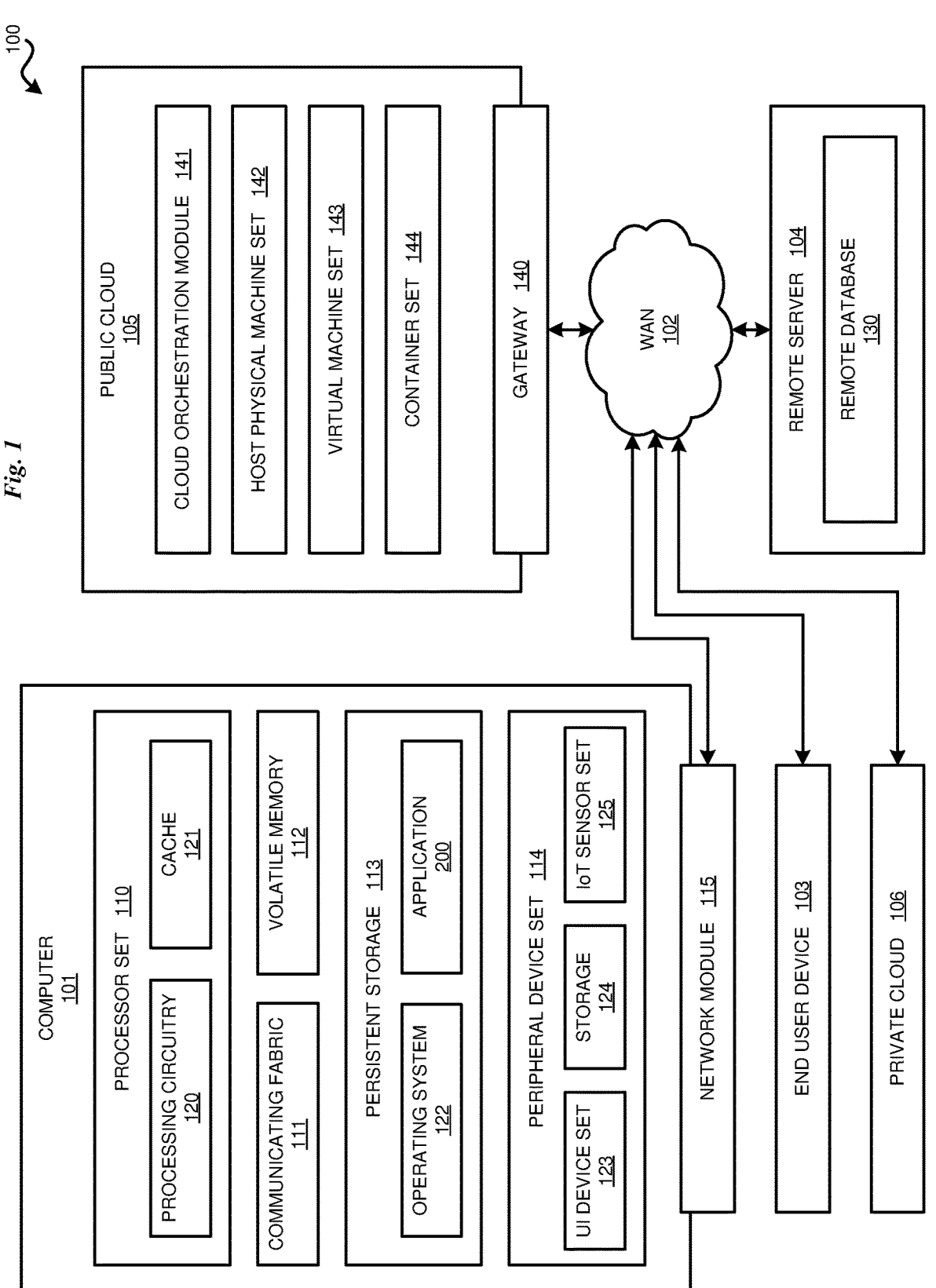
FIG. 1 depicts a block diagram of a computing environment in accordance with an illustrative embodiment.

The illustrative embodiments recognize that there is a need for an improved polynomial evaluation method for use under FHE, that, for a polynomial being evaluated, minimizes the number of non-scalar products that must be computed and the product depth required to compute the non-scalar products, while maintaining the accuracy of the results by avoiding multiplication of very large with very small numbers.

The present disclosure addresses the deficiencies described above by providing a process (as well as a system, method, machine-readable medium, etc.) that expands a polynomial into a plurality of products, each product comprising a polynomial coefficient multiplied by a sub-polynomial, computing a plurality of ciphertext products, each ciphertext product equal to a ciphertext multiplied by itself a number of times, and computing, using the plurality of ciphertext products, the plurality of products. Thus, the illustrative embodiments provide for polynomial evaluation under fully homomorphic encryption.

An illustrative embodiment receives a polynomial, for example a polynomial estimating a result of a mathematical operation that is not directly supported under FHE. One non-limiting example polynomial might estimate the square root operation on a number in ciphertext form, without first decrypting the input ciphertext. Another non-limiting example polynomial might estimate the sine operation on a number in ciphertext form, without first decrypting the input ciphertext.

A polynomial with one variable denoted by x can always be rewritten in the form $P(x)=a_n x^n + a_{n-1} x^{n-1} + \ldots + a_2 x^2 + a_1 x + a_0$, where $a_n, \ldots, a_0$ are constants that are coefficients of the polynomial and n denotes the degree of the polynomial. The same polynomial can also be rewritten in the "root term form" $P(x)=c*(x-r_1)*(x-r_2)* \ldots *(x-r_n)$, where c is a constant (referred to as a scaling coefficient) and $r_1$, $r_2, \ldots, r_n$ are constants referred to as roots of the polynomial. If an embodiment does not receive a polynomial in root term form, an embodiment uses a presently available algebraic manipulation technique to compute values for the coefficient and the roots of the polynomial.

An embodiment expands a polynomial written in the root term form $P(x)=c*(x-r_1)*(x-r_2)* \ldots *(x-r_n)$ into a plurality of products, according to a grouping parameter. In particular, if the polynomial is expanded using pairs of roots (i.e., the grouping parameter is set to 2) using a presently available algebraic manipulation technique, $$P(x) = c^{2/n} * \left(x^2 - (r_1 + r_2)x + r_1 r_2\right) *$$
$$c^{2/n} * \left(x^2 - (r_3 + r_4)x + r_3 r_4\right) * \ldots c^{2/n} *$$
$$\left(x^2 - (r_{n-1} + r_n)x + r_{n+1} r_n\right).$$

If the polynomial is expanded using groups of three roots (i.e., the grouping parameter is set to 3) using a presently available algebraic manipulation technique, $$P(x) = c^{3/n} * \left(x^3 - (r_1 + r_2 + r_3)x^2 + (r_3(r_1 + r_2) + r_1 r_2)x - r_1 r_2 r_3\right) *$$
$$c^{3/n} * \left(x^3 - (r_4 + r_5 + r_6)x^2 + (r_6(r_4 + r_5) + r_4 r_5)x - r_4 r_5 r_6\right) * \ldots c^{3/n} *$$
$$x^3 - (r_{n-2} + r_{n-1} + r_n)x^2 + (r_n(r_{n-2} + r_{n-1}) + r_{n-2} r_{n-1})x - r_{n-2} r_{n-1} r_n).$$

Similarly, the polynomial can be expanded using n/m groups of roots (where m denotes the grouping parameter, i.e., the number of roots in a root group) using a presently available algebraic manipulation technique, resulting in the expression:

$$P(x) = c^{m/n} * \left(x^m + a_{m-1} x^{m-1} + a_{m-2} x^{m-2} + \ldots + a_1 x + a_0\right) * \ldots$$

where $a_{m-1}$, $a_{m-2}$, . . . , $a_1$, $a_0$ are referred to herein as sub-polynomial coefficients, the $c^{m/n}$ term is referred to herein as a scaling coefficient, and each of the terms multiplied by a sub-polynomial coefficient (e.g., $(x^m + a_{m-1} x^{m-1} + a_{m-2}x^{m-2} + \ldots + a_1 x + a_0))$ is referred to herein as a sub-polynomial. Each term of the sub-polynomial, for example $a_{m-2} x^{m-2}$, is referred to herein as a polynomial term, in this example with a coefficient $a_{m-2}$ and a power $x^{m-2}$ that has an exponent m−2. The computation of the powers in the sub-polynomial terms such as $x^{m-2}$ involves costly ciphertext products under FHE when the x variable is replaced by a ciphertext. However, in the form described herein, ciphertext products need to be evaluated only once for all the sub-polynomials and re-used in each sub-polynomial. In particular, m powers of x can be computed just once for all the n/m sub-polynomials, Techniques are presently available to compute the m powers of x by optimizing the number and depth of the products, for example the power by squaring technique.

A value of the grouping parameter m is selectable by a user or an embodiment. In one embodiment, the grouping parameter is selected according to the specific polynomial being expanded for evaluation. Setting the grouping parameter to a relatively low number means that the polynomial coefficient $c^{m/n}$ can be correspondingly larger and the value of the highest power of x correspondingly smaller, resulting in a comparatively lower error rate. However, a smaller m implies that there are more sub-polynomials to evaluate, and fewer opportunities to reuse ciphertext products in computing higher power ciphertext products. On the other hand, setting m to a higher value results in a comparatively higher error rate, but with fewer sub-polynomials to evaluate and more opportunities to reuse ciphertext products in computing higher power ciphertext products. Thus, an embodiment might select the largest value for m that results in an acceptable error rate when evaluating the polynomial. This number depends on the degree n and coefficient c of the specific polynomial being evaluated.

When m is equal to the square root of n (the degree of the specific polynomial being evaluated), approximately the square root of n non-scalar products are needed to compute the ciphertext powers, and the square root of n more non-scalar products are needed to multiply all the sub-polynomials. Each sub-polynomial also involves m (i.e., approximately the square root of n) different scalar products. Thus, a total of approximately n scalar products and two times the square root of n products are required to evaluate a polynomial. These performance measures are slightly worse than a presently available technique but the method described herein provides increased numerical stability and a lower error rate than the presently available technique, characteristics that are mandatory when estimating many useful functions with high-level polynomials. One embodiment selects the square root of the degree n of the polynomial, rounded to the nearest integer, as a starting value for m, then adjusts m upward as long as an acceptable error rate is still being obtained when evaluating the polynomial on test data, or adjusts m downward until an acceptable error rate is obtained. In addition, not all sub-polynomials need use the same value for the grouping parameter, but the polynomial coefficient must be adjusted according to each different value.

An embodiment computes the scaling coefficient and the sub-polynomial coefficients of the sub-polynomials in the expanded polynomial.

To evaluate the polynomial for a particular ciphertext, an embodiment computes the ciphertext products specified by the expanded form of the polynomial. When computing ciphertext products, an embodiment reuses already-computed lower-power ciphertext products to compute higher-power ciphertext products. Then an embodiment uses the computed ciphertext products to evaluate the expanded polynomial. One embodiment performs the multiplications in series, by computing a result of a sub-polynomial, multiplying the result by the polynomial coefficient, multiplying that result by a previous multiplication result, and repeating for each of the remaining sub-polynomials. Another embodiment, optimizing the product depth, performs these multiplications in parallel as much as possible, computes results of each sub-polynomial multiplied by the scaling coefficient in parallel, then using a binary computation tree to multiply all of the results together. When m is equal to the square root of n, this binary computation has a product depth of approximately $\log^{2(n+m)}$, rounded up.

When neural networks are trained using encrypted data, one presently available technique is to approximate an activation layer of a neural network (e.g., a rectified linear unit or ReLu activation function, an activation function defined as the positive part of its argument) using a polynomial. Another presently available technique is to use trainable activation, in which polynomial coefficients of a polynomial intended to approximate an activation function are trained to achieve a prediction accuracy above a threshold amount. In one embodiment, a polynomial intended to approximate an activation function has a user-specified degree, for example 15. Thus, an embodiment trains encrypted polynomial coefficients using the representation:

$$\left(c^{m/n}a_{00} + c^{m/n}a_{10}x + \ldots + c^{m/n}a_{(m-1)0}x^{m-1} + c^{m/n}x^m\right) \ldots \left(c^{m/n}a_{0(n/m-1)} + \right.$$
$$\left. c^{m/n}a_{1(n/m-1)}x + \ldots + c^{m/n}a_{(m-1)(n/m-1)}x^{m-1} + c^{m/n}x^m\right),$$

where m and n are user-defined parameters, while c and $a_{ij}$ are trainable parameters. Then, replacing variables in the above equation using $f = c^{m/n}$ and $b_{ij} = c^{m/n}a_{ij}$, results in the following representation of a trainable polynomial:

$$\left(b_{00} + \ldots + b_{(m-1)0}x^{m-1} + fx^m\right) \ldots \left(b_{0(n/m-1)} + \ldots + b_{(m-1)(n/m-1)}x^{m-1} + fx^m\right).$$

Here, m and n are user-defined parameters, while $b_{ij}$ are trainable parameters. An embodiment computes gradients directly over the replaced variables, for example:

$$d/db_{i0} = x^i\left(b_{01} + \ldots + b_{(m-1)1}x^{m-1} + fx^m\right) \ldots \left(b_{0(n/m-1)} + \ldots + \right.$$
$$\left. b_{(m-1)(n/m-1)}x^{m-1} + fx^m\right)$$
$$d/df = x^m\left(b_{01} + \ldots + b_{(m-1)1}x^{m-1} + fx^m\right) \ldots \left(b_{0(n/m-1)} + \ldots + \right.$$
$$b_{(m-1)(n/m-1)}x^{m-1} + fx^m\right) + \ldots + x^m\left(b_{00}\right) + \ldots + b_{(m-1)0}x^{m-1} + fx^m\right) \ldots$$
$$\left(b_{0(n/m-2)} + \ldots + b_{(m-1)(n/m-2)}x^{m-1} + fx^m\right)$$

Thus, an embodiment is able to train coefficients of the estimating polynomial even when the polynomial has the form described herein, with improved numerical stability.

As well, if a polynomial is encrypted when expressed using a particular m, it is possible to switch the polynomial to an a*m form by expanding every 'a' brackets. For example, given a polynomial expressed in n/m groups, each having a sub-polynomial of degree m having m roots, an embodiment can expand each pair of consecutive groups, changing the representation to n/m/2 groups, each having a sub-polynomial of degree 2m having 2m roots. Thus, after training the polynomial using one value for m, the polynomial can be changed to a different representation with a higher m.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference to FIG. 1, this figure depicts a block diagram of a computing environment 100. Computing environment 100 contains an example of an environment for the execution of at least some of the computer code involved in performing the inventive methods, such as implementing polynomial evaluation under fully homomorphic encryption via application 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

Figure 2:
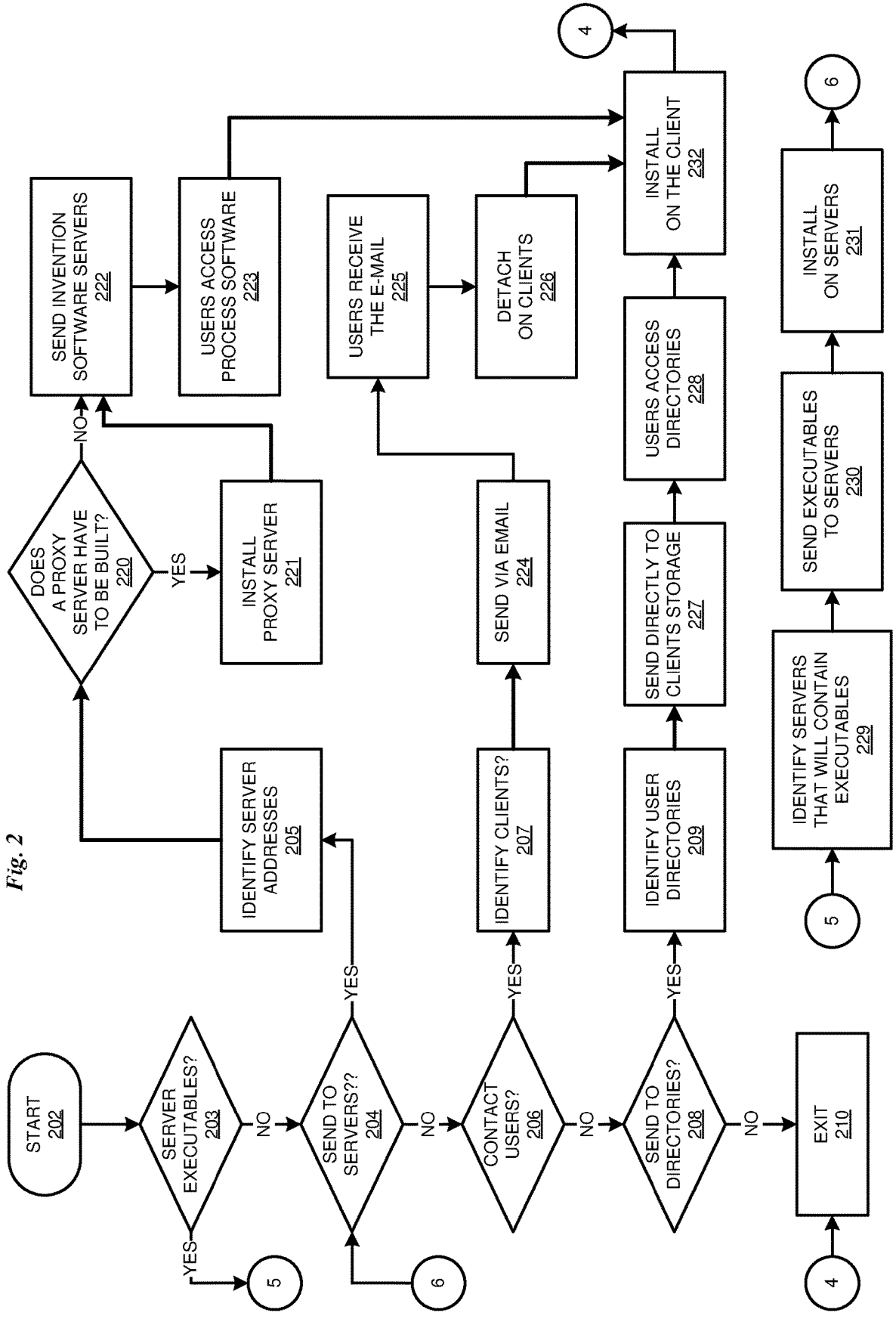
FIG. 2 depicts a flowchart of an example process for loading of process software in accordance with an illustrative embodiment.

With reference to FIG. 2, this figure depicts a flowchart of an example process for loading of process software in accordance with an illustrative embodiment. The flowchart can be executed by a device such as computer 101, end user device 103, remote server 104, or a device in private cloud 106 or public cloud 105 in FIG. 1.

While it is understood that the process software implementing polynomial evaluation under fully homomorphic encryption may be deployed by manually loading it directly in the client, server, and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Step 202 begins the deployment of the process software. An initial step is to determine if there are any programs that will reside on a server or servers when the process software is executed (203). If this is the case, then the servers that will contain the executables are identified (229). The process software for the server or servers is transferred directly to the servers' storage via FTP or some other protocol or by copying though the use of a shared file system (230). The process software is then installed on the servers (231).

Next, a determination is made on whether the process software is to be deployed by having users access the process software on a server or servers (204). If the users are to access the process software on servers, then the server addresses that will store the process software are identified (205).

A determination is made if a proxy server is to be built (220) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (221). The process software is sent to the (one or more) servers either via a protocol such as FTP, or it is copied directly from the source files to the server files via file sharing (222). Another embodiment involves sending a transaction to the (one or more) servers that contained the process software, and have the server process the transaction and then receive and copy the process software to the server's file system. Once the process software is stored at the servers, the users via their client computers then access the process software on the servers and copy to their client computers file systems (223). Another embodiment is to have the servers automatically copy the process software to each client and then run the installation program for the process software at each client computer. The user executes the program that installs the process software on his client computer (232) and then exits the process (210).

In step 206 a determination is made whether the process software is to be deployed by sending the process software to users via e-mail. The set of users where the process software will be deployed are identified together with the addresses of the user client computers (207). The process software is sent via e-mail to each of the users' client computers (224). The users then receive the e-mail (225) and then detach the process software from the e-mail to a directory on their client computers (226). The user executes the program that installs the process software on his client computer (232) and then exits the process (210).

Lastly, a determination is made on whether the process software will be sent directly to user directories on their client computers (208). If so, the user directories are identified (209). The process software is transferred directly to the user's client computer directory (227). This can be done in several ways such as, but not limited to, sharing the file system directories and then copying from the sender's file system to the recipient user's file system or, alternatively, using a transfer protocol such as File Transfer Protocol (FTP). The users access the directories on their client file systems in preparation for installing the process software (228). The user executes the program that installs the process software on his client computer (232) and then exits the process (210).

With reference to FIG. 3, this figure depicts a block diagram of an example configuration for polynomial evaluation under fully homomorphic encryption in accordance with an illustrative embodiment. Application 300 is the same as application 200 in FIG. 1.

In the illustrated embodiment, application 300 receives a polynomial, for example a polynomial estimating a result of a mathematical operation that is not directly supported under FHE. One non-limiting example polynomial might estimate the square root operation on a number in ciphertext form, without first decrypting the input ciphertext. Another non-limiting example polynomial might estimate the sine operation on a number in ciphertext form, without first decrypting the input ciphertext.

A polynomial with one variable denoted by x can always be rewritten in the form $P(x)=a_nx^n+a_{n-1}x^{n-1}+ \ldots +a_2x^2+a_1x+a_0$, where $a_n, \ldots, a_0$ are constants that are coefficients of the polynomial and n denotes the degree of the polynomial. The same polynomial can also be rewritten in the root term form $P(x)=c*(x-r_1)*(x-r_2)* \ldots *(x-r_n)$, where c is a constant (referred to as a scaling coefficient) and $r_1, r_2, \ldots, r_n$ are constants referred to as roots of the polynomial. If an embodiment does not receive a polynomial in root term form, expansion module 310 uses a presently available algebraic manipulation technique to compute values for the coefficient and the roots of the polynomial.

Expansion module 310 expands a polynomial written in the root term form $P(x)=c*(x-r_1)*(x-r_2)* \ldots *(x-r_n)$ into a plurality of products, according to a grouping parameter. In particular, if the polynomial is expanded using pairs of roots (i.e., the grouping parameter is set to 2) using a presently available algebraic manipulation technique, $$P(x) = c^{2/n} * \left(x^2 - (r_1 + r_2)x + r_1 r_2\right) * c^{2/n} * \left(x^2 - (r_3 + r_4)x + r_3 r_4\right) * \ldots c^{2/n} *$$
$$\left(x^2 - (r_{n-1} + r_n)x + r_{n+1} r_n\right).$$

If the polynomial is expanded using groups of three roots (i.e., the grouping parameter is set to 3) using a presently available algebraic manipulation technique, $$P(x) = c^{3/n} * \left(x^3 - (r_1 + r_2 + r_3)x^2 + (r_3(r_1 + r_2) + r_1 r_2)x - r_1 r_2 r_3\right) * c^{3/n} *$$
$$\left(x^3 - (r_4 + r_5 + r_6)x^2 + (r_6(r_4 + r_5) + r_4 r_5)x - r_4 r_5 r_6\right) * \ldots c^{3/n} * \left(x^3 - \right.$$
$$\left. (r_{n-2} + r_{n-1} + r_n)x^2 + (r_n(r_{n-2} + r_{n-1}) + r_{n-2} r_{n-1})x - r_{n-2} r_{n-1} r_n\right).$$

Similarly, the polynomial can be expanded using n/m groups of roots (where m denotes the grouping parameter, i.e., number of roots in a root group) using a presently available algebraic manipulation technique, resulting in the expression:

$$P(x) = c^{m/n} * \left(x^m + a_{m-1}x^{m-1} + a_{m-2}x^{m-2} + \ldots + a_1x + a_0\right) * \ldots$$

where $a_{m-1}, a_{m-2}, \ldots, a_1, a_0$ are referred to herein as sub-polynomial coefficients, the $c^{m/n}$ term is referred to herein as a scaling coefficient, and each of the terms multiplied by a sub-polynomial coefficient (e.g., $(x^m + a_{m-1} x^{m-1} + a_{m-2} x^{m-2} + \ldots + a_1 x + a_0))$ is referred to herein as a sub-polynomial. Each term of the sub-polynomial, for example $a_{m-2} x^{m-2}$, is referred to herein as a polynomial term, in this example with a coefficient $a_{m-2}$ and a power $x^{m-2}$ that has an exponent m−2. The computation of the powers in the sub-polynomial terms such as $x^{m-2}$ involves costly ciphertext products under FHE when the x variable is replaced by a ciphertext. However, in the form described herein, ciphertext products need to be evaluated only once for all the sub-polynomials and re-used in each sub-polynomial. In particular, m powers of x can be computed just once for all the n/m sub-polynomials, Techniques are presently available to compute the m powers of x by optimizing the number and depth of the products, for example the power by squaring technique.

A value of the grouping parameter m is selectable by a user or module 310. In one implementation of module 310, the grouping parameter is selected according to the specific polynomial being expanded for evaluation. Setting the grouping parameter to a relatively low number means that the polynomial coefficient $c^{m/n}$ can be correspondingly larger and the value of the highest power of x correspondingly smaller, resulting in a comparatively lower error rate. However, a smaller m implies that there are more sub-polynomials to evaluate, and fewer opportunities to reuse ciphertext products in computing higher power ciphertext products. On the other hand, setting m to a higher value results in a comparatively higher error rate, but with fewer sub-polynomials to evaluate and more opportunities to reuse ciphertext products in computing higher power ciphertext products. Thus, module 310 might select the largest value for m that results in an acceptable error rate when evaluating the polynomial. This number depends on the degree n and coefficient c of the specific polynomial being evaluated.

When m is equal to the square root of n (the degree of the specific polynomial being evaluated), approximately the square root of n non-scalar products are needed to compute the ciphertext powers, and the square root of n more non-scalar products are needed to multiply all the sub-polynomials. Each sub-polynomial also involves m (i.e., approximately the square root of n) different scalar products. Thus, a total of approximately n scalar products and two times the square root of n products are required to evaluate a polynomial. These performance measures are slightly worse than a presently available technique but the method described herein provides increased numerical stability and a lower error rate than the presently available technique, characteristics that are mandatory when estimating many useful functions with high-level polynomials. One implementation of module 310 selects the square root of the degree n of the polynomial, rounded to the nearest integer, as a starting value for m, then adjusts m upward as long as an acceptable error rate is still being obtained when evaluating the polynomial on test data, or adjusts m downward until an acceptable error rate is obtained. In addition, not all sub-polynomials need use the same value for the grouping parameter, but the polynomial coefficient must be adjusted according to each different value.

Coefficient module 320 computes the scaling coefficient and the sub-polynomial coefficients of the sub-polynomials in the expanded polynomial.

To evaluate the polynomial for a particular ciphertext, ciphertext product module 330 computes the ciphertext products specified by the expanded form of the polynomial. When computing ciphertext products, module 330 reuses already-computed lower-power ciphertext products to compute higher-power ciphertext products.

Polynomial computation module 340 uses the computed ciphertext products to evaluate the expanded polynomial. One implementation of module 340 performs the multiplications in series, by computing a result of a sub-polynomial, multiplying the result by the polynomial coefficient, multiplying that result by a previous multiplication result, and repeating for each of the remaining sub-polynomials. Another implementation of module 340, optimizing the product depth, performs these multiplications in parallel as much as possible, computes results of each sub-polynomial multiplied by the scaling coefficient in parallel, then using a binary computation tree to multiply all of the results together. When m is equal to the square root of n, this binary computation has a product depth of approximately log 2 (n+m), rounded up.

When neural networks are trained using encrypted data, one presently available technique is to approximate an activation layer of a neural network (e.g., a rectified linear unit or ReLu activation function, an activation function defined as the positive part of its argument) using a polynomial. Another presently available technique is to use trainable activation, in which polynomial coefficients of a polynomial intended to approximate an activation function are trained to achieve a prediction accuracy above a threshold amount. In one implementation of application 300, a polynomial intended to approximate an activation function has a user-specified degree, for example 15. Thus, application 300 trains encrypted polynomial coefficients using the representation:

$$\left(c^{m/n} a_{00} + c^{m/n} a_{10} x + \ldots + c^{m/n} a_{(m-1)0} x^{m-1} + c^{m/n} x^m\right) \ldots \left(c^{m/n} a_{0(n/m-1)} + c^{m/n} a_{1(n/m-1)} x + \ldots + c^{m/n} a_{(m-1)(n/m-1)} x^{m-1} + c^{m/n} x^m\right),$$

where m and n are user-defined parameters, while c and $a_{ij}$ are trainable parameters. Then, replacing variables in the above equation using $f = c^{m/n}$ and $b_{ij} = c^{m/n} a_{ij}$, results in the following representation of a trainable polynomial:

$$\left(b_{00} + \ldots + b_{(m-1)0} x^{m-1} + f x^m\right) \ldots \left(b_{0(n/m-1)} + \ldots + b_{(m-1)(n/m-1)} x^{m-1} + f x^m\right).$$

Here, m and n are user-defined parameters, while $b_{ij}$ are trainable parameters. Application 300 computes gradients directly over the replaced variables, for example:

$$d/db_{i0} = x^i \left(b_{01} + \ldots + b_{(m-1)1} x^{m-1} + f x^m\right) \ldots \left(b_{0(n/m-1)} + \ldots + b_{(m-1)(n/m-1)} x^{m-1} + f x^m\right)$$

$$d/df = x^m \left(b_{01} + \ldots + b_{(m-1)1} x^{m-1} + f x^m\right) \ldots \left(b_{0(n/m-1)} + \ldots + b_{(m-1)(n/m-1)} x^{m-1} + f x^m\right) + \ldots + x^m \left(b_{00} + \ldots + b_{(m-1)0} x^{m-1} + f x^m\right) \ldots \left(b_{0(n/m-2)} + \ldots + b_{(m-1)(n/m-2)} x^{m-1} + f x^m\right)$$

Thus, application 300 is able to train coefficients of the estimating polynomial even when the polynomial has the form described herein, with improved numerical stability.

As well, if a polynomial is encrypted when expressed using a particular m, it is possible to switch the polynomial to an a*m form by expanding every 'a' brackets. For example, given a polynomial expressed in n/m groups, each having a sub-polynomial of degree m having m roots, application 300 can expand each pair of consecutive groups, changing the representation to n/m/2 groups, each having a sub-polynomial of degree 2m having 2m roots. Thus, after training the polynomial using one value for m, the polynomial can be changed to a different representation with a higher m.

With reference to FIG. 4, this figure depicts an example of polynomial evaluation under fully homomorphic encryption in accordance with an illustrative embodiment. The example can be implemented using application 300 in FIG. 3.

Polynomial 410 is a polynomial in root term form, and includes scaling coefficient 412, variable 414, and roots 416. Rearranged polynomial 420 depicts polynomial 410 expanded into a plurality of products, using n/2 groups of two terms each, where n is the degree of polynomial 410. Each product in the plurality of products is a sub-polynomial, for example sub-polynomial 421. Each sub-polynomial, for example sub-polynomial 421, includes scaling coefficient 422, ciphertext product 423, sub-polynomial coefficients 424, and ciphertext 425.

Figure 5:
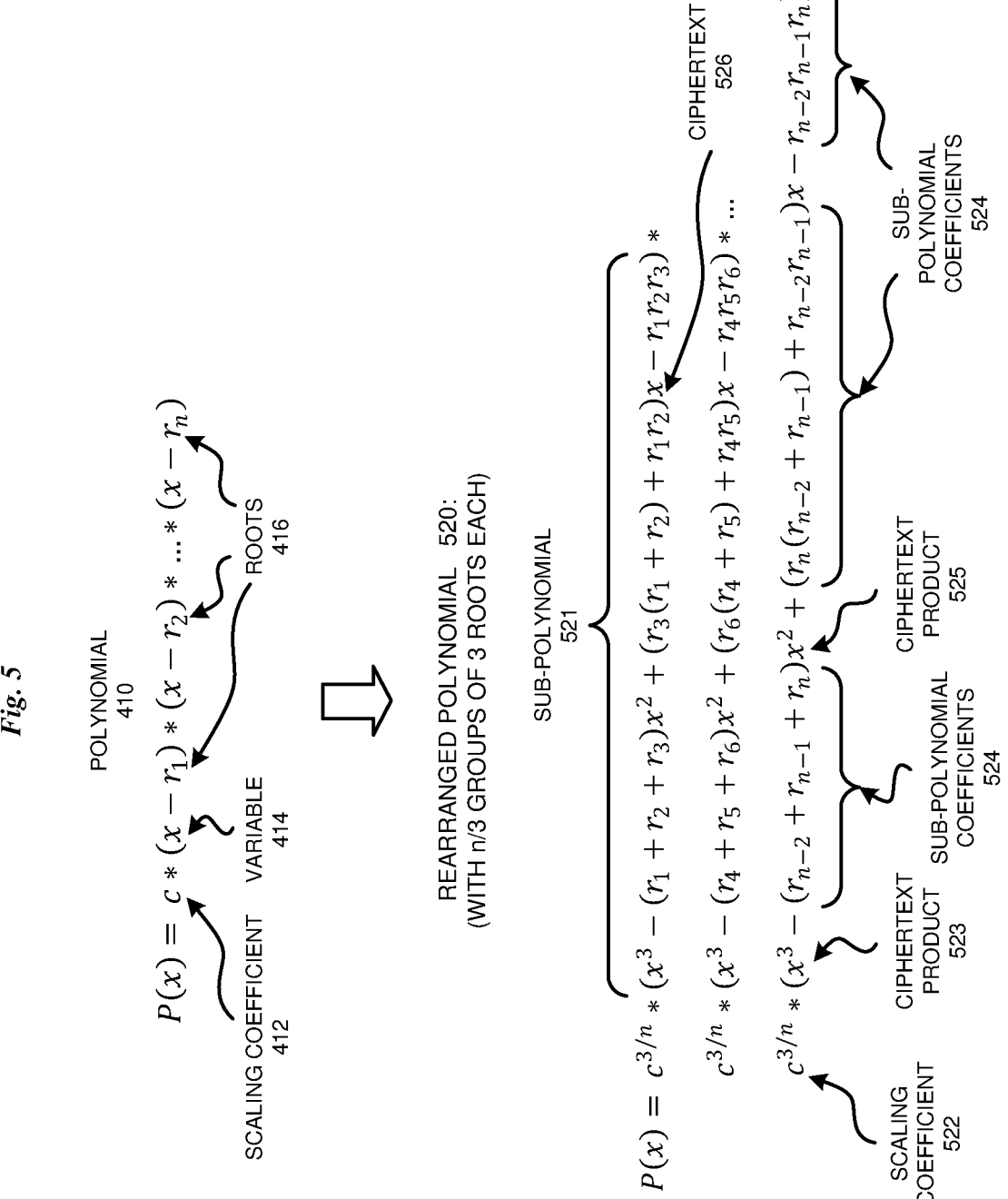
FIG. 5 depicts another example of polynomial evaluation under fully homomorphic encryption in accordance with an illustrative embodiment.

With reference to FIG. 5, this figure depicts another example of polynomial evaluation under fully homomorphic encryption in accordance with an illustrative embodiment. The example can be implemented using application 300 in FIG. 3. Polynomial 410, scaling coefficient 412, variable 414, and roots 416 are the same as polynomial 410, scaling coefficient 412, variable 414, and roots 416 in FIG. 4.

Here, rearranged polynomial 520 depicts polynomial 410 expanded into a plurality of products, using n/3 groups of three terms each, where n is the degree of polynomial 410. Each product in the plurality of products is a sub-polynomial, for example sub-polynomial 521. Each sub-polynomial, for example sub-polynomial 521, includes scaling coefficient 522, ciphertext products 523 and 525, sub-polynomial coefficients 524, and ciphertext 526.

With reference to FIG. 6, this figure depicts another example of polynomial evaluation under fully homomorphic encryption in accordance with an illustrative embodiment. The example can be implemented using application 300 in FIG. 3. Polynomial 410, scaling coefficient 412, variable 414, and roots 416 are the same as polynomial 410, scaling coefficient 412, variable 414, and roots 416 in FIG. 4.

Here, rearranged polynomial 620 depicts polynomial 410 expanded into a plurality of products, using n/m groups of m terms each, where n is the degree of polynomial 410. Each product in the plurality of products is a sub-polynomial, for example sub-polynomial 621. Each sub-polynomial, for example sub-polynomial 621, includes scaling coefficient 622, ciphertext products 623, 625, and 627, sub-polynomial coefficients 624 and 626, and ciphertext 628.

With reference to FIG. 7, this figure depicts another example of polynomial evaluation under fully homomorphic encryption in accordance with an illustrative embodiment. The example can be implemented using application 300 in FIG. 3.

Pseudocode 700 depicts evaluation of the polynomial for a particular ciphertext, including computing the ciphertext products specified by the expanded form of the polynomial. The ciphertext products can be computed by known optimal methods for computing multiple powers, such as method involving power by squaring. Then the computed ciphertext products are used to evaluate the expanded polynomial in a loop, where for each sub-polynomial denoted by i, the code computes a result of sub-polynomial i, multiplies the result by the polynomial coefficient, and multiplies that result by a previous multiplication result. The loop repeats for each of the sub-polynomials i. Thus pseudocode 700 depicts performing the polynomial evaluation in series.

Parallelized computation 710 depicts evaluation of the polynomial for a particular ciphertext by replacing the loop of pseudocode 700 with parallel evaluations of the scaling coefficients multiplied by each of the sub-polynomials, then then using a binary computation tree to multiply all of the results together as depicted. When m is equal to the square root of n, this binary computation has a product depth 715 of approximately $\log^{2(n+m)}$, rounded up.

With reference to FIG. 8, this figure depicts a flowchart of an example process for polynomial evaluation under fully homomorphic encryption in accordance with an illustrative embodiment. Process 800 can be implemented in application 300 in FIG. 3.

In the illustrated embodiment, at block 802, the process expands a polynomial into a plurality of products, each product in the plurality of products comprising a scaling coefficient multiplied by a sub-polynomial, each sub-polynomial comprising a sum of a plurality of addends, wherein a degree of each sub-polynomial is equal to a grouping parameter. In block 804, the process computes a plurality of ciphertext products, each ciphertext product equal to a ciphertext multiplied by itself a number of times, the number of times ranging from two to the grouping parameter. In block 806, the process computes, using the ciphertext and the plurality of ciphertext products in place of a variable of the polynomial, each of the plurality of products. In block 808, the process multiplies the plurality of products together. Then the process ends.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:
reducing computational error and enhancing an accuracy of an evaluation output of an application performing Fully Homomorphic Encryption (FHE) computation, the reducing comprising:
expanding a polynomial expression in memory into a plurality of products instructions, each product instruction in the plurality of products instructions executing to perform a scaling coefficient multiplied by a sub-polynomial, each sub-polynomial comprising a sum of a plurality of addends, wherein a degree of each sub-polynomial is equal to a grouping parameter;
computing a plurality of ciphertext products, each ciphertext product equal to a ciphertext multiplied by itself a number of times, the number of times ranging from two to the grouping parameter;
computing, using the ciphertext and the plurality of ciphertext products in place of a variable of the polynomial, each of the plurality of products; and
multiplying the plurality of products together such that in the evaluation output of the FHE computation a number of non-scalar product computations is minimized and a depth of computation tree is minimized by parallelizing a multi-product multiplication.

2. The computer-implemented method of claim 1, wherein the grouping parameter is equal to two.

3. The computer-implemented method of claim 1, wherein the grouping parameter is equal to the square root of a degree of the polynomial rounded to the nearest integer.

4. The computer-implemented method of claim 1, wherein computing each of the plurality of products is performed in series.

5. The computer-implemented method of claim 1, wherein computing each of the plurality of products is performed in parallel.

6. The computer-implemented method of claim 1, wherein the polynomial is a representation of a neural network activation layer being trained and the ciphertext is an encrypted polynomial coefficient of the polynomial.

7. A computer program product comprising one or more computer readable storage media, and program instructions collectively stored on the one or more computer readable storage media, the program instructions executable by a processor to cause the processor to perform operations comprising:
reducing computational error and enhancing an accuracy of an evaluation output of an application performing Fully Homomorphic Encryption (FHE) computation, the reducing comprising:
expanding a polynomial expression in memory into a plurality of products instructions, each product instruction in the plurality of products instructions executing to perform a scaling coefficient multiplied by a sub-polynomial, each sub-polynomial comprising a sum of a plurality of addends, wherein a degree of each sub-polynomial is equal to a grouping parameter;

computing a plurality of ciphertext products, each ciphertext product equal to a ciphertext multiplied by itself a number of times, the number of times ranging from two to the grouping parameter;

computing, using the ciphertext and the plurality of ciphertext products in place of a variable of the polynomial, each of the plurality of products; and multiplying the plurality of products together such that in the evaluation output of the FHE computation a number of non-scalar product computations is minimized and a depth of computation tree is minimized by parallelizing a multi-product multiplication.

8. The computer program product of claim 7, wherein the stored program instructions are stored in a computer readable storage device in a data processing system, and wherein the stored program instructions are transferred over a network from a remote data processing system.

9. The computer program product of claim 7, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:

program instructions to meter use of the program instructions associated with the request; and program instructions to generate an invoice based on the metered use.

10. The computer program product of claim 7, wherein the grouping parameter is equal to two.

11. The computer program product of claim 7, wherein the grouping parameter is equal to the square root of a degree of the polynomial rounded to the nearest integer.

12. The computer program product of claim 7, wherein computing each of the plurality of products is performed in series.

13. The computer program product of claim 7, wherein computing each of the plurality of products is performed in parallel.

14. The computer program product of claim 7, wherein the polynomial is a representation of a neural network activation layer being trained and the ciphertext is an encrypted polynomial coefficient of the polynomial.

15. A computer system comprising a processor and one or more computer readable storage media, and program instructions collectively stored on the one or more computer readable storage media, the program instructions executable by the processor to cause the processor to perform operations comprising:

reducing computational error and enhancing an accuracy of an evaluation output of an application performing Fully Homomorphic Encryption (FHE) computation, the reducing comprising:

expanding a polynomial expression in memory into a plurality of products instructions, each product instruction in the plurality of products instructions executing to perform a scaling coefficient multiplied by a sub-polynomial, each sub-polynomial comprising a sum of a plurality of addends, wherein a degree of each sub-polynomial is equal to a grouping parameter;

computing a plurality of ciphertext products, each ciphertext product equal to a ciphertext multiplied by itself a number of times, the number of times ranging from two to the grouping parameter;

computing, using the ciphertext and the plurality of ciphertext products in place of a variable of the polynomial, each of the plurality of products; and multiplying the plurality of products together such that in the evaluation output of the FHE computation a number of non-scalar product computations is minimized and a depth of computation tree is minimized by parallelizing a multi-product multiplication.

16. The computer system of claim 15, wherein the grouping parameter is equal to two.

17. The computer system of claim 15, wherein the grouping parameter is equal to the square root of a degree of the polynomial rounded to the nearest integer.

18. The computer system of claim 15, wherein computing each of the plurality of products is performed in series.

19. The computer system of claim 15, wherein computing each of the plurality of products is performed in parallel.

20. The computer system of claim 15, wherein the polynomial is a representation of a neural network layer being trained and the ciphertext is an encrypted polynomial coefficient of the polynomial.

* * * * *